United States Patent
Pina et al.

(10) Patent No.: US 9,599,977 B1
(45) Date of Patent: Mar. 21, 2017

(54) PROGRAMMABLE SYSTEM ARCHITECTURE FOR POWER CONTROLLERS INCLUDING THREAD EXECUTION RESPONSIVE TO POWER TRAIN EVENT

(71) Applicant: Cirrus Logic, Inc., Austin, TX (US)

(72) Inventors: Jean C. Pina, Austin, TX (US); John L. Melanson, Austin, TX (US); Robert T. Grisamore, Austin, TX (US); Eric J. King, Dripping Springs, TX (US); Spencer Isaacson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 394 days.

(21) Appl. No.: 14/198,076

(22) Filed: Mar. 5, 2014

Related U.S. Application Data

(60) Provisional application No. 61/782,341, filed on Mar. 14, 2013.

(51) Int. Cl.
  *G05D 3/12* (2006.01)
  *G05B 19/042* (2006.01)
  *G05B 19/05* (2006.01)

(52) U.S. Cl.
  CPC ....... *G05B 19/042* (2013.01); *G05B 19/0423* (2013.01); *G05B 19/054* (2013.01)

(58) Field of Classification Search
  None
  See application file for complete search history.

(56) References Cited

U.S. PATENT DOCUMENTS

| | | | | |
|---|---|---|---|---|
| 6,220,987 B1* | 4/2001 | Robichaux | .......... | F16H 61/0213 477/110 |
| 7,217,221 B2* | 5/2007 | Sah | .......... | B60K 6/445 477/3 |
| 8,392,091 B2* | 3/2013 | Hebbale | .......... | F01N 9/00 60/274 |
| 8,924,975 B2* | 12/2014 | Memik | .......... | G06F 9/4843 702/186 |
| 9,020,669 B2* | 4/2015 | Books | .......... | B60W 50/14 701/22 |
| 9,163,815 B2* | 10/2015 | Elferich | .......... | H02M 1/4258 |
| 9,214,153 B2* | 12/2015 | Reilly | .......... | G10K 15/02 |
| 2011/0023047 A1* | 1/2011 | Memik | .......... | G06F 9/4843 718/104 |

(Continued)

*Primary Examiner* — Van Nguyen
(74) *Attorney, Agent, or Firm* — Jackson Walker L.L.P.

(57) ABSTRACT

A power train may have a power train input and a power train output, wherein the power train is configured to transfer electrical energy from the power train input to a load coupled to the power train output in conformity with one or more power train control signals. A scheduler may be configured to receive events from the power train and, responsive to each particular event, schedule execution of a thread of control instructions responsive to the particular event, wherein the thread is selected from a plurality of threads. A processor may be configured to execute the threads of control instructions scheduled by the scheduler, such that for each particular event the processor generates one or more power train control signals responsive to the particular event within a first switching cycle of receipt of the particular event or within a second switching cycle immediately subsequent to the first switching cycle.

13 Claims, 1 Drawing Sheet

(56) References Cited

U.S. PATENT DOCUMENTS

| | | | | |
|---|---|---|---|---|
| 2013/0271021 A1* | 10/2013 | Elferich | .............. | H02M 1/4258 |
| | | | | 315/206 |
| 2014/0091720 A1* | 4/2014 | Brinlee | .............. | H05B 33/0815 |
| | | | | 315/186 |
| 2015/0138844 A1* | 5/2015 | Karlsson | ........... | H02M 3/33592 |
| | | | | 363/21.1 |

* cited by examiner

PROGRAMMABLE SYSTEM ARCHITECTURE FOR POWER CONTROLLERS INCLUDING THREAD EXECUTION RESPONSIVE TO POWER TRAIN EVENT

RELATED APPLICATION

The present disclosure claims priority to U.S. Provisional Patent Application Ser. No. 61/782,341, filed Mar. 14, 2013, which is incorporated by reference herein in its entirety.

FIELD OF DISCLOSURE

The present disclosure relates in general to the field of electronics, and more specifically to systems and methods for providing a programmable system architecture for power controllers.

BACKGROUND

Switching power control modules are found in many applications, including without limitation power supplies and low-power lighting systems. Such switching power control modules are typically designed to generate control signals for operating a power train for transferring electrical energy from an input of the power train to a load coupled to the output of the power train based on one or more physical variables related to the power train or the type of system in which it is utilized.

Algorithms implemented by switching power control modules often require cycle-by-cycle control for controlling one or more switches of a power train, wherein such cycles are defined by frequencies varying from as little as a few kilohertz to as much as a few megahertz. Accordingly, in many instances, to ensure proper operation of the system in which the power train is utilized, the switching power control module must respond to events (e.g., variation in an input signal of the power train or some other electrical characteristic of the power train) within a very short amount of time, oftentimes in as little as nanoseconds, which may impose difficult real-time response requirements. Despite such requirements, it is often desirable that control solutions for switching power control modules be low cost.

Accordingly, traditional switching power control modules are based on algorithms implemented in logic gates, and often lack programmability. To solve for the lack of programmability, suboptimal solutions have been utilized, such as employing off-the-shelf microcontrollers and general purpose peripherals.

SUMMARY

In accordance with the teachings of the present disclosure, certain disadvantages and problems associated with use of traditional power controller architectures may be reduced or eliminated.

An apparatus may include a power train, a scheduler, and a processor. The power train may have a power train input and a power train output, wherein the power train is configured to transfer electrical energy from the power train input to a load coupled to the power train output in conformity with one or more power train control signals. The scheduler may be configured to receive events from the power train and, responsive to each particular event, schedule execution of a thread of control instructions responsive to the particular event, wherein the thread is selected from a plurality of threads. The processor may be configured to execute the threads of control instructions scheduled by the scheduler, such that for each particular event the processor generates one or more power train control signals responsive to the particular event within a first switching cycle of receipt of the particular event or within a second switching cycle immediately subsequent to the first switching cycle.

In accordance with these and other embodiments of the present disclosure, a method may include receiving events from a power train having a power train input and a power train output, wherein the power train is configured to transfer electrical energy from the power train input to a load coupled to the power train output in conformity with one or more power train control signals. The method may also include, responsive to each particular event, scheduling execution of a thread of control instructions responsive to the particular event, wherein the thread is selected from a plurality of threads. The method may further include executing the threads of control in accordance with the scheduling, such that for each particular event the processor generates one or more power train control signals responsive to the particular event within a first switching cycle of receipt of the particular event or within a second switching cycle immediately subsequent to the first switching cycle.

In accordance with these and other embodiments of the present disclosure, an apparatus may include a scheduler and a processor. The scheduler may be for receiving events from a power train and, responsive to each particular event, scheduling execution of a thread of control instructions responsive to the particular event, wherein the thread is selected from a plurality of threads. The processor may be for executing the threads of control instructions scheduled by the scheduler, such that for each particular event the processor generates one or more power train control signals for controlling the power train responsive to the particular event within a first switching cycle of receipt of the particular event or within a second switching cycle immediately subsequent to the first switching cycle.

Technical advantages of the present disclosure may be readily apparent to one of ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
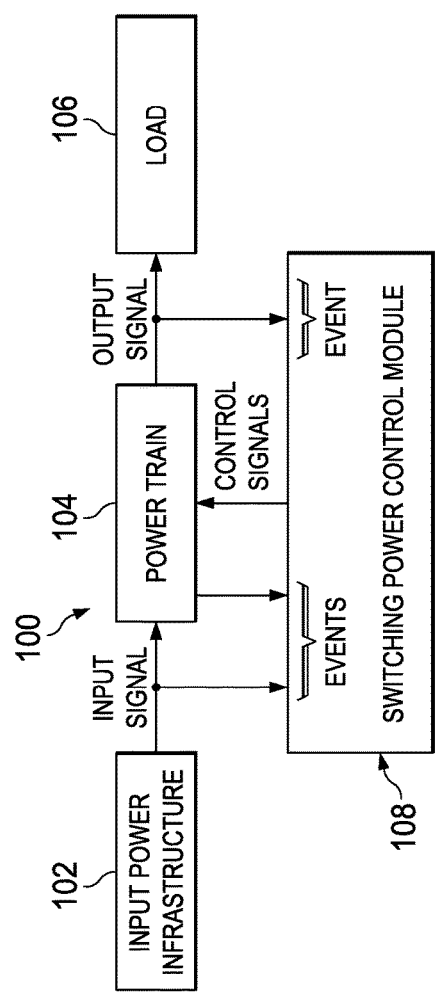
FIG. 1 illustrates an example electrical system including a programmable switching power control module for controlling a power train, in accordance with embodiments of the present disclosure.

FIG. 1 illustrates an example electrical system 100 including a programmable switching power control module 108 for controlling a power train 104, in accordance with embodiments of the present disclosure. As shown in FIG. 1, example electrical system 100 may also include an input power infrastructure 102 and a load 106.

Input power infrastructure 102 may comprise any suitable combination of electric and/or electronic components for generating an appropriate input signal to power train 104. For example, input power infrastructure 102 may include a voltage supply for generating a supply voltage (e.g., a nominally 60 Hz/210 V line voltage in the United States of America or a nominally 50 Hz/220 V line voltage in Europe). In addition, input power infrastructure 102 may include one or more other components for conditioning or modifying the supply voltage for use by power train 104. For example, in embodiments in which electrical system 100 is a low-power lighting system, input power infrastructure 102 may include a dimmer for generating a dimming signal to other elements of a lighting system, a transformer (e.g., an electronic or magnetic transformer) for stepping down the supply voltage to a lower voltage (e.g., 12 volts), and/or other suitable components.

Power train 104 may comprise any system, device, or apparatus for transferring electrical energy from its input terminals (e.g., from input power infrastructure 102) to a load (e.g., load 106) coupled to its output terminals in conformity with one or more control signals received from switching power control module 108. Thus, in accordance with such one or more control signals, power train 104 may generate an output signal (e.g., a voltage and/or a current) for delivering electrical energy to a suitable load at the output terminals of power train 104. For example, in embodiments in which electrical system 100 is a low-power lighting system, power train 104 may deliver an output voltage and/or an output current for illuminating one or more lamps (e.g., light-emitting diodes) comprising load 106. To carry out such functionality, power train 104 may include one or more of a signal rectifier (e.g., a bridge rectifier for rectifying dimmer output signal $V_{\Phi\_DIM}$), a boost converter, a buck converter, another type of power converter, a capacitor, another type of energy storage device, and/or any other suitable electrical and/or electronic component. In particular embodiments, one or more power converters of power train 104 may be switching power converters configured to convert an electrical signal (e.g., alternating current to direct current conversion, direct current to direct current conversion, etc.) based on one or more switching control signals (e.g., pulse-width modulated (PWM) signals) received by switches (e.g., transistors) integral to the switching power converters or another component of power train 104.

Load 106 may comprise any system, device, or apparatus for receiving electrical energy from power train 104. For example, in a lighting system, load 106 may comprise a lamp (e.g., an LED) for converting electrical energy delivered from power train 104 to photonic energy.

Switching power control module 108 may comprise any system, device, or apparatus configured to, as described in greater detail elsewhere in this disclosure, receive one or more events associated with power train 104, and responsive to such one or more events, generate control signals for control of operation of power train 104. In some embodiments, switching power control module 108, power train 104, and/or load 106 may be part of a larger electrical or electronic assembly. For example, in some embodiments, switching power control module 108, power train 104, and/or load 106 may be integral to a single lamp assembly (e.g., a multifaceted reflected form factor, such as an MR 16 form factor).

Figure 2:
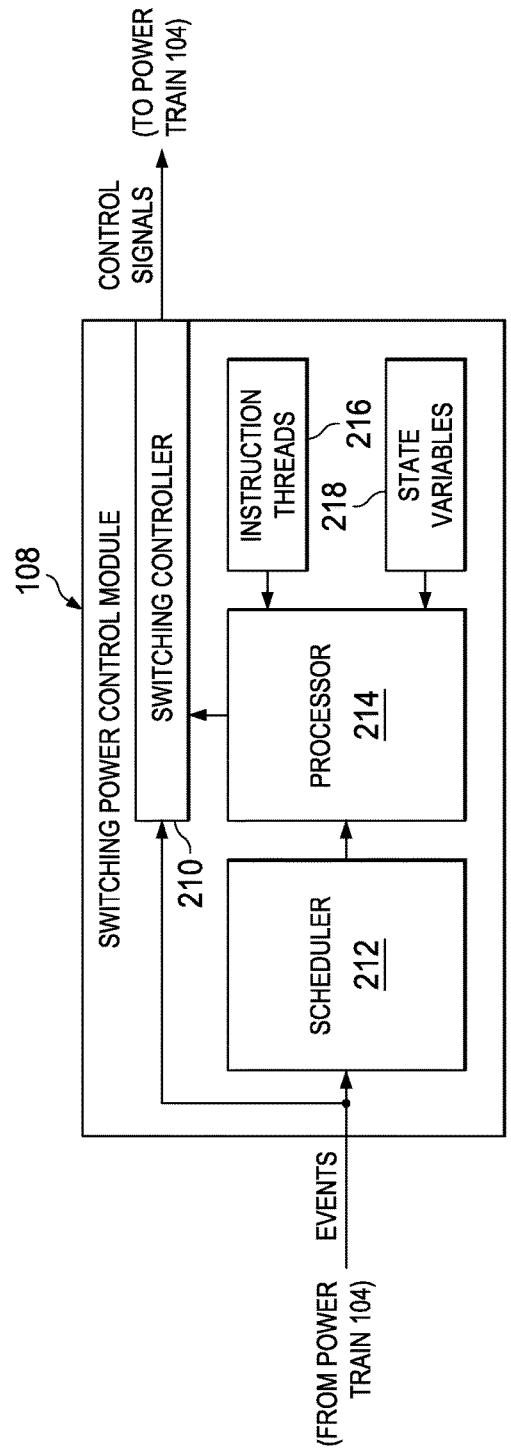
FIG. 2 illustrates an example switching power control module for controlling a power train, in accordance with embodiments of the present disclosure.

To carry out its functionality, switching power control module 108 may comprise, among other components, a switching controller 210, a scheduler 212, a processor 214, and processor-readable storage media comprising instruction threads 216 and state variables 218, as shown in FIG. 2.

Switching controller 210 may comprise any suitable system, device, or apparatus for generating one or more control signals for controlling operation of power train 104, including controlling switching of switches internal to power train 104. In some embodiments, control signals generated by switching controller 210 may comprise PWM signals (e.g., square wave signals with a varying duty cycle, such that on and off times of switches internal to power train 104 are controlled by the varying duty cycles). In some embodiments, switching controller may be configured to receive one or more events from power train 104 and, responsive to a received event, modify its execution. Such events may comprise any suitable event occurring at, with, or within power train 104, including without limitation the occurrence of a variation, threshold crossing, particular periodicity, and/or any other physical quantity of or associated with the input signal received by power train 104, the output signal generated by power train 104, and/or any intermediate signal internal to power train 104.

Scheduler 212 may comprise any suitable system, device, or apparatus for receiving one or more events from power train 104 and, responsive to each particular event, schedule execution of a thread of control instructions responsive to the particular event, wherein the thread is selected from a plurality of threads. Such events may comprise any suitable event occurring at, with, or within power train 104, including without limitation the occurrence of a variation, threshold crossing, particular periodicity, and/or any other physical quantity of or associated with the input signal received by power train 104, the output signal generated by power train 104, and/or any intermediate signal internal to power train 104. Scheduler 212 may communicate its scheduling of a thread to processor 214 in any suitable manner, including without limitation communicating a memory address of the thread within storage media storing instruction threads 216.

Processor 214 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions (e.g., control instructions embodied in instruction threads 216) and/or process data (e.g., data embodied in state variables 218). In some embodiments, processor 214 may comprise a multi-threaded processor configured to simultaneously execute a plurality of threads.

In operation, processor 214 may be configured to execute the instruction threads 216 as scheduled by scheduler 212, such that for each particular event, processor 214, via manipulation of switching controller 210 in accordance with the executed instruction threads 216, cause switching power control module 108 to generate one or more power train control signals responsive to the particular event. In some embodiments, processor may cause such one or more power train control signals to issue within a switching cycle (e.g., width of a PWM signal communicated as part of a control signal) of receipt of the particular event by scheduler 212 or during an immediately subsequent switching cycle. In these and other embodiments, processor 214 may be configured to interleave execution of respective instructions of two or more instruction threads 216 scheduled by scheduler 212, in order to reduce latency in execution of the plurality of threads.

In addition, each particular thread of the instruction threads 216 may maintain one or more state variables 218 associated with the particular thread independent from state variables associated with threads other than the particular thread. Such state variables 218 associated with a thread may include any suitable data regarding the thread, including a pointer indicative of the state of execution of the thread, data for use by the thread in performing calculations associated with the thread, data for storing information relevant to the thread, and/or any other data.

Although any suitable number and types of threads may execute in response to any suitable number and types of events, some non-limiting examples may further illustrate the systems and methods disclosed herein. For example, in some embodiments, in order to avoid sub-harmonic noise within power train 104 when an input signal falls below a predetermined threshold signal level, scheduler 212 may schedule and processor 214 may execute an instruction thread whereby control signals are generated to control power train 104 such that it operates in accordance with a current continuous mode algorithm based on a constant peak current and a constant demagnetization time, and upon occurrence of a pre-defined event (e.g., a timeout in detecting the programmed peak current), scheduler 212 may schedule and processor 214 may execute an instruction thread providing different control for power train 104.

As another example, in these and other embodiments, in embodiments in which electrical system 100 comprises a lighting system and input power infrastructure comprises a triac-based dimmer, to avoid premature disconnection of the dimmer after initial attachment, switching power control module 108 may be programmed to emulate a low-impedance path when the dimmer is in a disconnect state and perform an event-based switch to a new control mode (e.g., current continuous mode) on a cycle-by-cycle basis in response to occurrence of a dimmer attach condition (e.g., as indicated by a peak current detection event of power train 104).

As used herein, when two or more elements are referred to as "coupled" to one another, such term indicates that such two or more elements are in electronic communication whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An apparatus comprising:
  a power train having a power train input and a power train output, wherein the power train is configured to transfer electrical energy from the power train input to a load coupled to the power train output in conformity with one or more power train control signals;
  a scheduler that receives events from the power train and, responsive to each particular event, scheduling execution of a thread of control instructions responsive to the particular event, wherein the thread is selected from a plurality of threads; and
  a processor that executes the threads of control instructions scheduled by the scheduler, such that for each particular event the processor generates one or more power train control signals responsive to the particular event within a first switching cycle of receipt of the particular event or within a second switching cycle immediately subsequent to the first switching cycle,
  wherein the processor interleaves execution of respective instructions of two or more of the plurality of threads, in order to reduce latency in execution of the plurality of threads, and
  wherein each particular thread of the plurality of threads maintains one or more state variables associated with the particular thread independent from state variables associated with threads other than the particular thread.

2. The apparatus of claim 1, wherein the processor is a multi-threaded processor configured to simultaneously execute a plurality of threads.

3. The apparatus of claim 1, wherein the load comprises a lamp.

4. The apparatus of claim 3, wherein the lamp comprises a light-emitting diode lamp.

5. The apparatus of claim 4, wherein the apparatus further comprises a lamp assembly including the lamp, the power train, the scheduler, and the processor.

6. The apparatus of claim 4, wherein the apparatus comprises a multifaceted reflector form factor.

7. A method comprising:
  receiving events from a power train having a power train input and a power train output, wherein the power train is configured to transfer electrical energy from the power train input to a load coupled to the power train output in conformity with one or more power train control signals;
  responsive to each particular event, scheduling execution of a thread of control instructions responsive to the particular event, wherein the thread is selected from a plurality of threads;
  executing, by a processor, the threads of control instructions in accordance with the scheduling, such that for each particular event the processor generates one or more power train control signals responsive to the particular event within a first switching cycle of receipt of the particular event or within a second switching cycle immediately subsequent to the first switching cycle; and interleaving, by the processor, execution of respective instructions of two or more of the plurality of threads, in order to reduce latency in execution of the plurality of threads, wherein each particular thread of the plurality of threads maintains one or more state variables associated with the particular thread independent from state variables associated with threads other than the particular thread.

8. The method of claim 7, wherein the processor is a multi-threaded processor configured to simultaneously execute a plurality of threads.

9. The method of claim 7, wherein the load comprises a lamp.

10. The method of claim 9, wherein the lamp comprises a light-emitting diode lamp.

11. The method of claim 9, wherein the lamp and the power train are integral to a multifaceted reflector form factor.

12. An apparatus comprising:

a scheduler that receives events from a power train and, responsive to each particular event, scheduling execution of a thread of control instructions responsive to the particular event, wherein the thread is selected from a plurality of threads; and a processor that executes the threads of control instructions scheduled by the scheduler, such that for each particular event the processor generates one or more power train control signals for controlling the power train responsive to the particular event within a first switching cycle of receipt of the particular event or within a second switching cycle immediately subsequent to the first switching cycle, wherein the processor interleaves execution of respective instructions of two or more of the plurality of threads, in order to reduce latency in execution of the plurality of threads, and wherein each particular thread of the plurality of threads maintains one or more state variables associated with the particular thread independent from state variables associated with threads other than the particular thread.

13. The apparatus of claim 12, wherein the processor is a multi-threaded processor configured to simultaneously execute a plurality of threads.

* * * * *